July 5, 1960 G. D. BRUCE ET AL 2,944,225

OSCILLATORS

Original Filed Sept. 30, 1954

*INVENTORS*
GEORGE D. BRUCE
ROBERT L. EIBSEN

*BY* P. E. Henninger
ATTORNEY 2,944,225

OSCILLATORS

George D. Bruce, Poughkeepsie, and Robert L. Eibsen, Hopewell Junction, N.Y., assignors to International Business Machines Corporation, New York, N.Y., a corporation of New York Continuation of abandoned application Ser. No. 459,387, Sept. 30, 1954. This application Feb. 11, 1957, Ser. No. 639,583

7 Claims. (Cl. 331—113)

Figure 1:
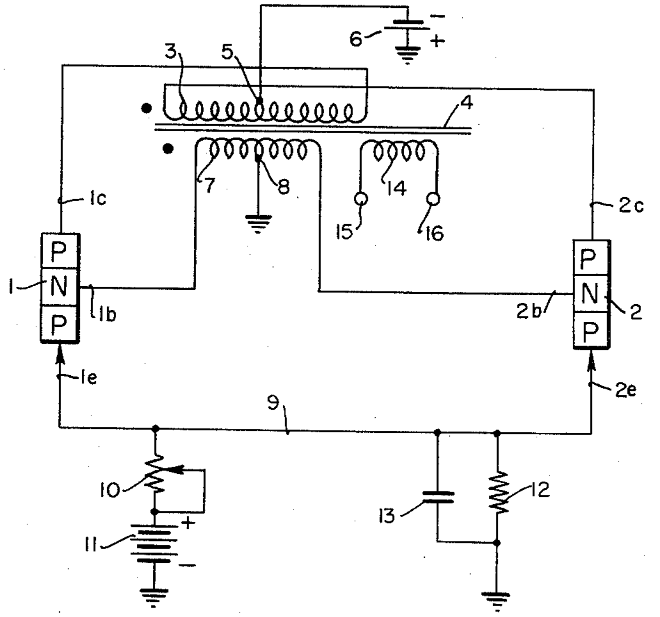

This application is a continuation of our pending application Serial No. 459,387, filed September 30, 1954, entitled "Square Wave Generators Using a Junction Transistor," now abandoned.

This invention relates to oscillators, and especially to square wave generators for operating heavy loads at high frequencies, for example, 100 kc.

Modern high speed computers utilize electrical signal pulses to actuate various computing circuits. For accurate handling of signals and for clear distinction from stray magnetic fields, it is desirable to use square waves. In order to secure high speed operation of the computer, it is desirable to use these square waves at frequencies of approximately 100 kc. In order to coordinate all the functions of a computer, it is essential that all the pulses be timed from the same basic generator. Since such computers are tremendously complex, involving thousands of circuits, it is evident that the load on the basic generator in such a computer is great.

It is desirable to use transistors wherever possible in such a computer, because of the low power requirements of transistors as compared to other equivalent devices.

It is an object of the present invention to provide a square wave generator suitable for supplying heavy loads at frequencies of the order of 100 kc.

Another object of the invention is to provide such a generator which is suitable for use as the basic pulse generator in a high speed computer.

Another object of the invention is to provide a generator of the type described employing transistors.

The foregoing objects are attained in the circuits described herein by connecting two transistors in push-pull, with a positive feed-back for each transistor and negative cross coupling between the two transistors.

The two transistors, shown as PNP junction transistors, supply currents to the opposite halves of a primary winding on an output transformer. A secondary winding of the transformer is connected to provide feedback potentials to the bases of the two transistors. The secondary winding is connected so that it supplies a positive feedback from the output circuit of each transistor to its input, and also cooperates with the other half of the primary winding to provide negative cross coupling from the opposite transistor. The primary and secondary windings are center tapped, the taps being connected through current limiting means including resistor and capacitor and suitable biasing means to the emitters of the transistors.

The circuit operates as a relaxation oscillator. One transistor comes on and the current flow through it increases due to the positive feedback while the current flow through the other is blocked by the negative cross coupling. This continues until the current limiting resistor in the emitter circuit comes into play, whereupon the current flow decreases, the positive feedback effect stops and negative cross-coupling becomes effective to turn the other transistor on.

Other objects and advantages of the invention will become apparent from a consideration of the following specification and claims, taken together with the accompanying drawings.

Figure 2:
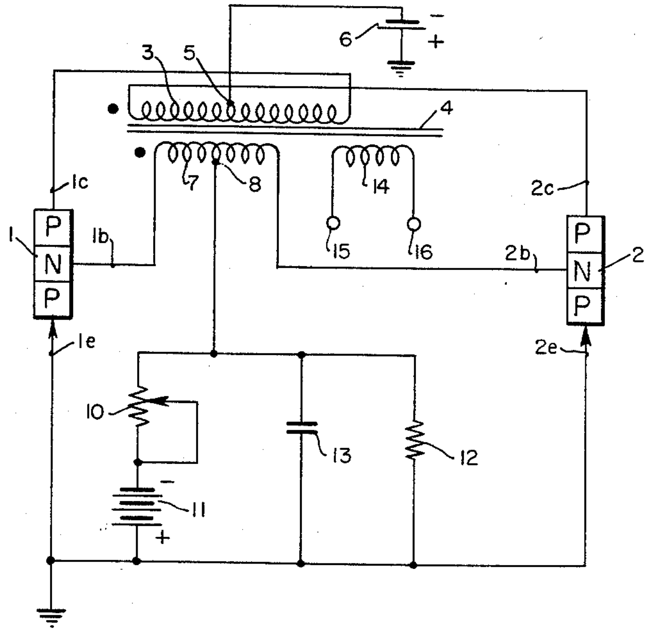

In the drawings:

Figure 1 is a wiring diagram of a square wave generator circuit embodying the invention, and Figure 2 is a wiring diagram of a modified square wave generator circuit embodying the invention.

FIGURE 1

The circuit of Figure 1 includes two PNP transistors 1 and 2, having emitter electrodes **1*e*, and 2*e*, base electrodes 1*b* and 2*b*, and collector electrodes 1*c* and 2*c***.

Collector electrodes **1*c* and 2*c* are respectively connected to the opposite ends of a primary winding 3 of an output transformer indicated at 4. The primary winding 3 has center tap 5 connected through a biasing battery 6** to ground.

Transformer 4 has a secondary winding 7 having opposite terminals connected respectively to the bases **1*b* and 2*b* and a center tap 8 which is grounded. The primary and secondary windings 3 and 7 are magnetically arranged and electrically connected so that that half of primary winding 3 which is connected in series with collector 1*c* produces a magnetic flux in the transformer having a direction such that the potential induced by the flux in winding 7 when the current and flux are increasing has the proper polarity, to provide a positive feedback into the base 1*b* of transistor 1, thereby further increasing the current flow through collector 1*c***. Conversely, when the current and flux are decreasing, the polarity of the induced potential is reversed, so that it tends to decrease the current still more.

A similar relationship exists between that half of primary winding 3 connected in series with collector **2*c* and the half of secondary winding 7 connected in series with base 2*b***.

On the other hand, an increasing current flowing through the half of secondary winding 3 connected in series with collector **1*c* produces a flux which induces, in that half of secondary winding 7 connected in series the base 2*b*, a potential having a polarity tending to reduce or block the flow of current in transistor 2. Conversely, a decreasing current through collector 1*c* produces a potential at base 2*b* tending to increase the flow of current in transistor 2. The same is true of the relationship between the current flow through collector 2*c* and the potential induced as a result thereof in series with base 1*b***. This is the negative cross-coupling arrangement referred to above.

Emitters **1*e* and 2*e* are connected together through a wire 9. Connected between wire 9 and ground is a variable resistor 10 in series with battery 11. Also connected between wire 9 and ground are a fixed resistor 12 and a parallel capacitor 13**.

An output secondary winding 14 is provided on transformer 4, connected to output terminals 15 and 16.

OPERATION—FIGURE 1

When the circuit of Figure 1 is first energized, both transistors 1 and 2 tend to conduct. By virtue of the negative cross-coupling effect described above, one transistor or the other predominates and cuts off current flow in the other transistor. Assume that the transistor 1 is the predominating transistor and is effective to cut off the flow in transistor 2. The current flow through transistor 1 then induces a positive fedback potential in secondary winding 7 in a direction to keep the current increasing through collector **1*c*. As this current flow increases, the current flow through emitter 1*e* and resistor 10 likewise increases. The increased potential drop across resistor 10 tends to swing emitter 1*e*** in a negative direction, which tends to decrease the current flow in transistor 1. Eventually a point is reached where the effect of the negative swing of emitter 1e overcomes the effect of the positive feedback through base 1b and the current flow through collector 1c stops increasing. When that happens, the current increasing feedback into the base 1b becomes a current decreasing feedback, and aids the current limiting resistor 10 to decrease the current flow through collector 1c. The effects are cumulative, and result in quickly switching transistor 1 off. When the current flow through collector 1c is decreasing, the potential induced in secondary winding 7 supplies a potential to base 2b tending to increase the current through transistor 2. The increasing current flow through transistor 2 tends to reinforce the positive feedback into base 2b, thereby turning transistor 2 on just as quickly as transistor 1 turns off. The cycle of operation described above is then repeated so that transistor 1 is again switched on. The cycle continues endlessly.

The frequency of operation of the square wave generator is determined by the setting of resistor 10.

Resistor 12 serves to shunt part of the current from battery 11 through resistors 10 and 12 to ground, and thereby to establish a positive bias on the emitters effective to turn on the transistors. Capacitor 13 acts as a source of stored potential at the time of switching, and thereby tends to make the switching faster, improving the rise times of the transistors.

It will be recognized that the transformer coupling allows heavy output currents to be carried in the secondary winding 14, and retains the impedance of the output circuit connected to terminals 15 and 16 substantially independent of the internal impedance of the generator circuit.

FIGURE 2

Figure 2 is generally similar to Figure 1, except that the current connections are somewhat differently located, so that the emitters 1e and 2e are grounded and the biasing potentials from battery 11 and resistor 10 are supplied between ground and the bases 1b and 2b. The operation of the circuit of Figure 2 is analogous to that of Figure 1. Corresponding elements have been given the same reference numerals in the two figures. It is considered that further description of Figure 2 or its operation is unnecessary.

While I have shown PNP transistors, it will be recognized that NPN transistors could be used with equal facility, provided the necessary changes are made in the various battery polarities.

The following table shows by way of example particular values for the potentials of the various batteries, and for the impedance of the various resistors and capacitors in circuits which have been operated successfully. In some cases, these values are also shown in the drawing. These values are set forth by way of example only, and the invention is not limited to them nor to any of them.

*Table 1*

| | |
|---|---|
| Battery 6 | 8 volts. |
| Resistor 10 | 50,000 ohms. |
| Battery 11 | 15 volts. |
| Resistor 12 | 1,000 ohms. |
| Capacitor 13 | 0.005 mfd. |
| Winding 3/winding 7 | 6 to 1 turn ratio. |

While we have shown and described certain preferred embodiments of our invention, other modifications will readily occur to those skilled in the art, and we therefore intend our invention to be limited only by the appended claims.

We claim:

1. A free-running square wave generator, comprising two transistors, each having an input electrode, an output electrode, and a common electrode, transformer means having primary winding means and secondary winding means, first non-resonant circuit means including the primary winding means and connected to the output electrodes, second non-resonant circuit means including the secondary winding means and connected to the input electrodes in a sense so that the transformer means provides regenerative feedback from each output electrode to the input electrode of its associated transistor and degenerative feedback from each output electrode to the input electrode of the other transistor, said first and second non-resonant circuit means and said transformer means constituting the only source of signals for said input electrodes and cooperating during an increase in current flow at a constant rate through one of said output electrodes to produce a constant potential feedback regeneratively to the input electrode associated with said one output electrode and degeneratively to the other input electrode, a source of unidirectional electrical energy connected between said first circuit means and said common electrodes to provide current flow through said output electrodes in their high impedance directions, and means effective to limit said current flow, and thereby to terminate said constant rate of increase and said constant potential feedback.

2. A free-running square wave generator as defined in claim 1, including a second source of unidirectional electrical energy and means connecting said second source between said common electrodes and said input electrodes to provide current flow through the input electrodes in their low impedance direction.

3. A free-running square wave generator as defined in claim 1, in which said current flow limiting means comprises a resistor degeneratively coupled between said common electrodes and said input electrodes.

4. A free-running square wave generator as defined in claim 1, in which said current flow limiting means comprises a network of three parallel branches connected between said common electrodes and said input electrodes, one of said branches comprising a variable resistor in series with a second source of unidirectional energy poled to provide current flow through the input electrodes in their low impedance direction, a second of said branches comprising a second resistor and the third of said branches comprising a capacitor.

5. A free-running square wave generator, comprising two transistors, each having an input electrode, an output electrode, and a common electrode, transformer means having primary and secondary windings, each winding having a center tap, first non-resonant circuit means including the primary winding and connected to the output electrodes, second non-resonant circuit means including the secondary winding and connected to the input electrodes in a sense so that the transformer means provides regenerative feedback from each output electrode to the input electrode of its associated transistor and degenerative feedback from each output electrode to the input electrode of the other transistor, said first and second non-resonant circuit means and said transformer means constituting the only source of signals for said input electrodes, first connecting means between the center tap on the primary winding and a common junction, second connecting means between the center tap on the secondary winding and the common junction, third connecting means between the common electrodes and the common junction, one of said first and second connecting means comprising a first source of unidirectional electrical energy of a polarity to provide current flow through said output electrodes in their high impedance directions, and one of said second and third connecting means comprising a second source of unidirectional electrical energy of a polarity to provide current flow through said input electrodes in their low impedance directions, and means effective to limit said last-mentioned current flow.

6. A free-running square wave generator as defined in claim 5, including a third winding on said transformer means, and non-resonant load means connected to said third winding.

7. A free-runing square wave generator, comprising two transistors, each having an input electrode, an output electrode, and a common electrode, transformer means having primary and secondary windings, each winding having a center tap, first non-resonant circuit means including the primary winding and connected to the output electrodes, second non-resonant circuit means including the secondary winding and connected to the input electrodes in a sense so that the transformer means provides regenerative feedback from each output electrode to the input electrode of its associated transistor and degenerative feedback from each output electrode to the input electrode of the other transistor, said first and second non-resonant circuit means and said transformer means constituting the only source of signals for said input electrodes, first connecting means between the center tap on the primary winding and a common junction, second connecting means between the center tap on the secondary winding and the common junction, third connecting means between the common electrodes and the common junction, one of said first and second connecting means comprising a first source of unidirectional electrical energy of a polarity to provide current flow through said output electrodes in their high impedance directions, and one of said second and third connecting means comprising first and second parallel branches, said first parallel branch including a variable resistor and said second parallel branch including a capacitor.

References Cited in the file of this patent

UNITED STATES PATENTS

| | | |
|---|---|---|
| 2,462,903 | Romander | Mar. 1, 1949 |
| 2,783,384 | Bright et al. | Feb. 26, 1957 |

OTHER REFERENCES

"An Amplitude Stabilized Transistor Oscillator" by Kretzmer, presented September 1953, published in Proc. of the I.R.E., vol. 42, pp. 391–401, February 1954.